United States Patent
Kamon et al.

(10) Patent No.: US 7,009,690 B2
(45) Date of Patent: Mar. 7, 2006

(54) THREE-DIMENSIONAL MEASUREMENT DEVICE AND THREE-DIMENSIONAL MEASUREMENT METHOD

(75) Inventors: Koichi Kamon, Kawanishi (JP); Toshio Norita, Osaka (JP); Hiroshi Uchino, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 675 days.

(21) Appl. No.: 09/855,506

(22) Filed: May 16, 2001

(65) Prior Publication Data

US 2001/0046317 A1 Nov. 29, 2001

(30) Foreign Application Priority Data

May 26, 2000 (JP) .............................. 2000-155768

(51) Int. Cl.
- *G01C 3/00* (2006.01)
- *G01C 3/08* (2006.01)
- *G01C 5/00* (2006.01)
- *G06K 9/00* (2006.01)

(52) U.S. Cl. ...................... 356/3; 356/4.07; 356/5.01; 382/154; 382/151; 348/348

(58) Field of Classification Search ................ 382/154, 382/151; 250/559.19; 348/139, 348, 221.1, 348/294–295; 396/89, 106, 111; 356/4.07, 356/4.01, 5.01, 3

See application file for complete search history.

(56) References Cited

U.S. PATENT DOCUMENTS

| | | | | |
|---|---|---|---|---|
| 4,678,323 A | * | 7/1987 | Sato et al. | 356/4.07 |
| 4,947,202 A | * | 8/1990 | Kitajima et al. | 396/103 |
| 5,699,151 A | * | 12/1997 | Akasu | 356/5.01 |
| 5,930,383 A | * | 7/1999 | Netzer | 382/154 |
| 6,091,905 A | * | 7/2000 | Yahav et al. | 396/106 |
| 6,252,655 B1 | * | 6/2001 | Tanaka | 356/5.06 |
| 6,587,183 B1 | * | 7/2003 | Uomori et al. | 356/3.1 |
| 6,812,964 B1 | * | 11/2004 | Tani et al. | 348/296 |

FOREIGN PATENT DOCUMENTS

| | | |
|---|---|---|
| JP | 10-332827 | 12/1998 |
| WO | WO 97/01112 | 1/1997 |

* cited by examiner

*Primary Examiner*—Bhavesh M. Mehta
*Assistant Examiner*—John Strege
(74) *Attorney, Agent, or Firm*—McDermott Will & Emery LLP

(57) ABSTRACT

The purpose of the present invention is to realize a compact three-dimensional measurement device of high resolution. In the present invention, a pulse light is projected on an object, the light reflected from the object is received by a solid state area sensor having a plurality of photoelectric conversion elements, the area sensor is controlled with a timing synchronized with the projection of the pulse light, and the distance to each photoelectric conversion element is measured based on the output of the solid state area sensor.

16 Claims, 17 Drawing Sheets

FIG.15

| | frame(n) | frame(n+1) | frame(n+2) | frame(n+3) | frame(n+4) | frame(n+5) |
|---|---|---|---|---|---|---|
| EMISSION CONTROL | INTER-MITTENT EMISSION | INTER-MITTENT EMISSION | INTER-MITTENT EMISSION | EMISSION OFF | INTER-MITTENT EMISSION | EMISSION OFF |
| EXPOSURE CONTROL | INTER-MITTENT EMISSION | INTER-MITTENT EMISSION | INTER-MITTENT EMISSION | INTER-MITTENT EMISSION | CONTIN-UOUS EXPOSURE | CONTIN-UOUS EXPOSURE |

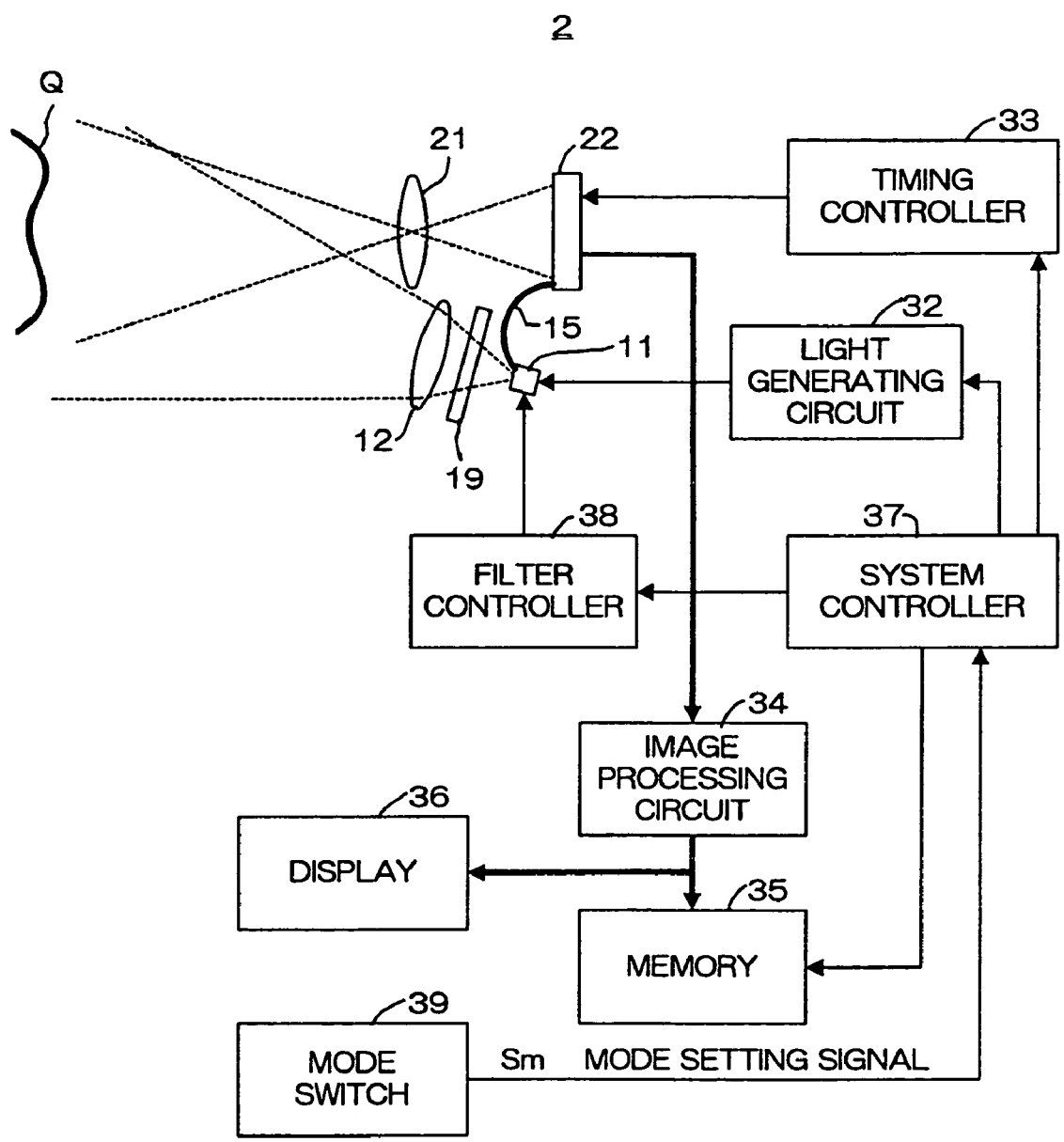

THREE-DIMENSIONAL MEASUREMENT DEVICE AND THREE-DIMENSIONAL MEASUREMENT METHOD

RELATED APPLICATION

This application is based on Patent Application No. 2000-155768 filed in Japan, the entire content of which is hereby incorporated by reference.

BACKGROUND OF THE INVENTION

1. Field of the Invention

The present invention relates to a three-dimensional measurement method and device for obtaining position information of an object by projecting light and receiving the light reflected from the object.

2. Description of the Related Art

Three-dimensional measurement can be accomplished using the time of flight (TOF) from the moment of light pulse transmission to the reception of the returning light pulse reflected by an object since this TOF is dependent on distance.

Japanese Laid-Open Patent Application No. H11-508371 discloses a device using a solid state area sensor as a photoreceptor device for modulating light entering the solid state area sensor by a photoelectric modulator. The distance is reflected in the amount of exposure light of the solid state area sensor by photoreception modulation synchronized with the projection light. The distance information to the object can be obtained regardless of the reflectivity of the object by determining the ratio of the amount of exposure light with modulation and the amount of exposure light without modulation. A measurement of distance to multiple points (so-called three-dimensional measurement or three-dimensional input) can be accomplished at higher speed using a solid state area sensor than which deflects the optical path by a scanning mechanism.

Japanese Laid-Open Patent Application NO. H10-332827 discloses a device for repeatedly projecting pulse light at uniform intervals, standardizing the amount of light of the reflected and returning pulse light which enters a solid state area sensor, and measuring the amount of light exposure in a specific period. The amount of exposure light is proportional to the frequency (number of pulses) of the reflected pulse light, such that the exposure light is slight when time-of-flight is long and the distance far. Three-dimensional input independent of the reflectivity of the object is possible by standardizing the amount of light of the reflected pulse light.

It is difficult to make a device compact since a light modulation device must be included in a construction for controlling the exposure timing of the solid state area sensor by light modulation as described above. In a construction for standardizing the amount of light of the reflected pulse light, disadvantages arise inasmuch as the allowed range of reflectivity of the object and the measurable distance range are limited by the performance of the optical system used for such standardization, such that resolution is determined by the period of the projection.

In the aforesaid conventional constructions, high-speed measurement at short distances is difficult because each uses a method of detection of the length of the time-of-flight based on the amount of exposure light.

SUMMARY OF THE INVENTION

An object of the present invention is to eliminate the previously described disadvantages. Another object of the present invention is to realize high-resolution three-dimensional measurement in a compact form factor. Another object of the present invention is to realize three-dimensional measurement capable of input of a desired precision in the three-dimensional measurement. Still another object of the present invention is to increase the distance range in three-dimensional measurement.

These and other objects are attained by a three-dimensional measurement method for measuring a distance to a plurality of positions on an object by projecting light and receiving light reflected from the object, said three-dimensional measurement method comprising the steps of: projecting a pulse light on an object; receiving light reflected from the object by an area sensor comprising a plurality of photoelectric conversion elements; controlling the active/inactive timing of the area sensor such that the photoelectric conversion elements are exposed to light with a timing synchronously with the pulse light projection; and measuring the distance to each photoelectric conversion element based on the output of the area sensor.

These objects of the present invention are further attained by a three-dimensional measurement device for measuring the distance to a plurality of positions on an object by projecting light and receiving the light reflected from the object, said three-dimensional measurement device comprising: a projector for projecting pulse light on an object; an area sensor comprising a plurality of photoelectric conversion elements for receiving light reflected from the object; a controller for controlling the ON/OFF states of the photoelectric elements with a timing synchronized with the pulse light projection; and a processor for eliminating the fluctuating component of the received light intensity due to distance or reflectivity of the object from the amount of exposure obtained based on the ON/OFF control.

These and other objects are attained by a three-dimensional measurement method for measuring a distance to a plurality of positions on an object by projecting light and receiving light reflected from the object, said three-dimensional measurement method comprising the steps of: sequentially projecting light of a first luminance distribution and light of a second luminance distribution on an object; receiving light reflected by the object in each projection cycle by a solid state area sensor comprising a plurality of photoelectric elements; and measuring the distance to each photoelectric element based on the output of the solid state area sensor in a first projection and the output of the solid state area sensor in a second projection.

The invention itself, together with further objects and attendant advantages, will be best understood by reference to the following detailed description taken in conjunction with the accompanying drawings.

BRIEF DESCRIPTION OF THE DRAWINGS

FIG. 15 shows the summary of a fourth modification of the control;

FIG. 18 shows the structure of a three-dimensional measurement device of a second embodiment.

In the following description, like parts are designated by like reference numbers throughout the several drawings.

DESCRIPTION OF THE PREFERRED EMBODIMENTS

First Embodiment

Device Structure

Figure 1:
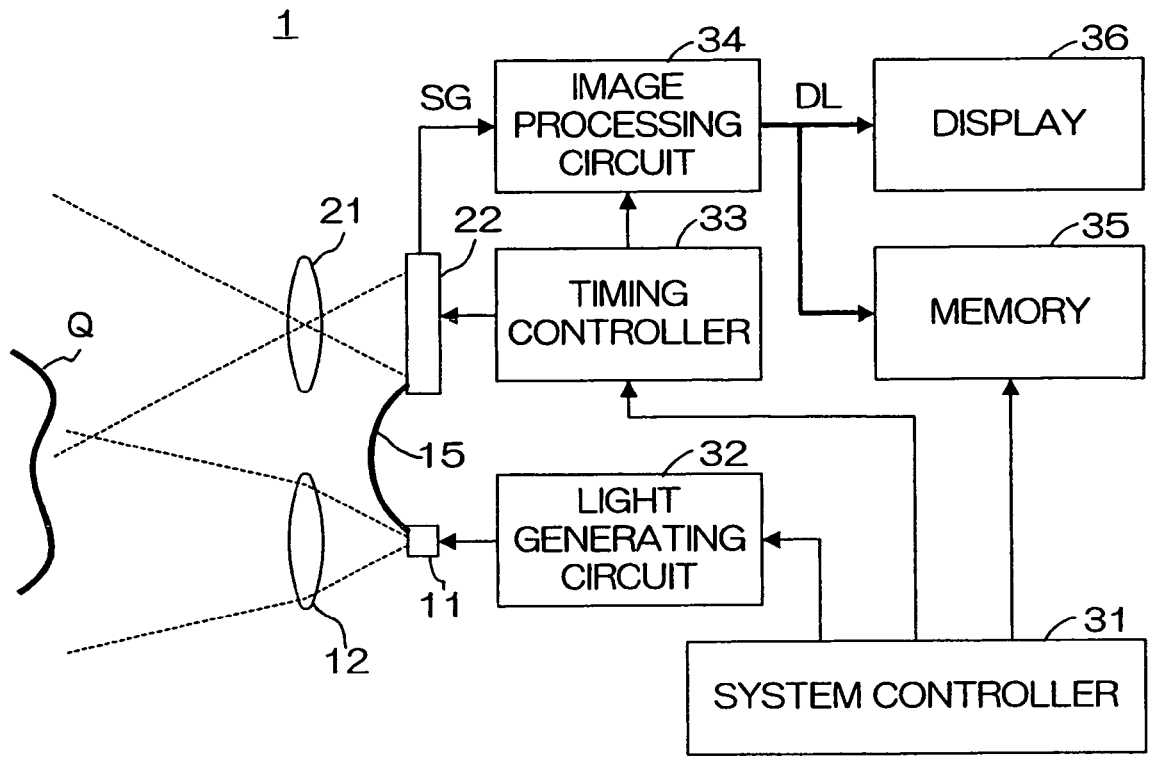
FIG. 1(*a*) and FIG. 1(*b*) show the structure of a three-dimensional measure device of a first embodiment.
Figure 1:
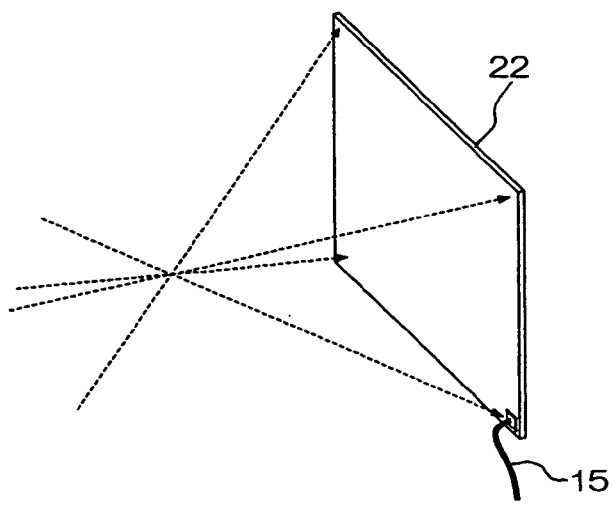

FIGS. 1(a) and 1(b) show the structure of a three-dimensional measure device of the first embodiment. FIG. 1(a) shows the entire structure, and FIG. 1(b) shows the structure of the image sensing surface.

A three-dimensional measurement device 1 is provided with a light source 11, projection lens 12, light receiving lens 21, and solid state area sensor 22. The light source 11 receives power from a light generating circuit 32, and emits laser light. An object Q is illuminated by the laser light passing through the projection lens 12. The light reflected from the object Q passes through the light receiving lens 21, and impinges the solid state area sensor 22. The solid state area sensor 22 has pixels which block the light from outside the device, and part of the laser light from the light source 11 passes through an internal optical path 15 comprised of optical fiber without passing outside and directly impinges the pixel as "standard light." Hereinafter, the light passing through the light receiving lens 21 and impinging the solid state area sensor 22 is referred to as "measurement light," the pixel impinged by this measurement light is referred to as the "measurement pixel," and the pixel impinged by the standard light is referred to as the "standard pixel."

The solid state area sensor 22 operates in accordance with a clock of the timing controller 33, and outputs image signals SG representing the amount of exposure on each pixel of the unit photoreception area to an image processing circuit 34. The image processing circuit 34 performs specific calculations, and distance data DL obtained from these calculations are transmitted to a storage memory 35 and a display 36 used for a monitor display. Controls relating to the light projection and reception and signal processing in the three-dimensional measurement device 1 are managed by the system controller 31.

Measurement Method

Figure 2:
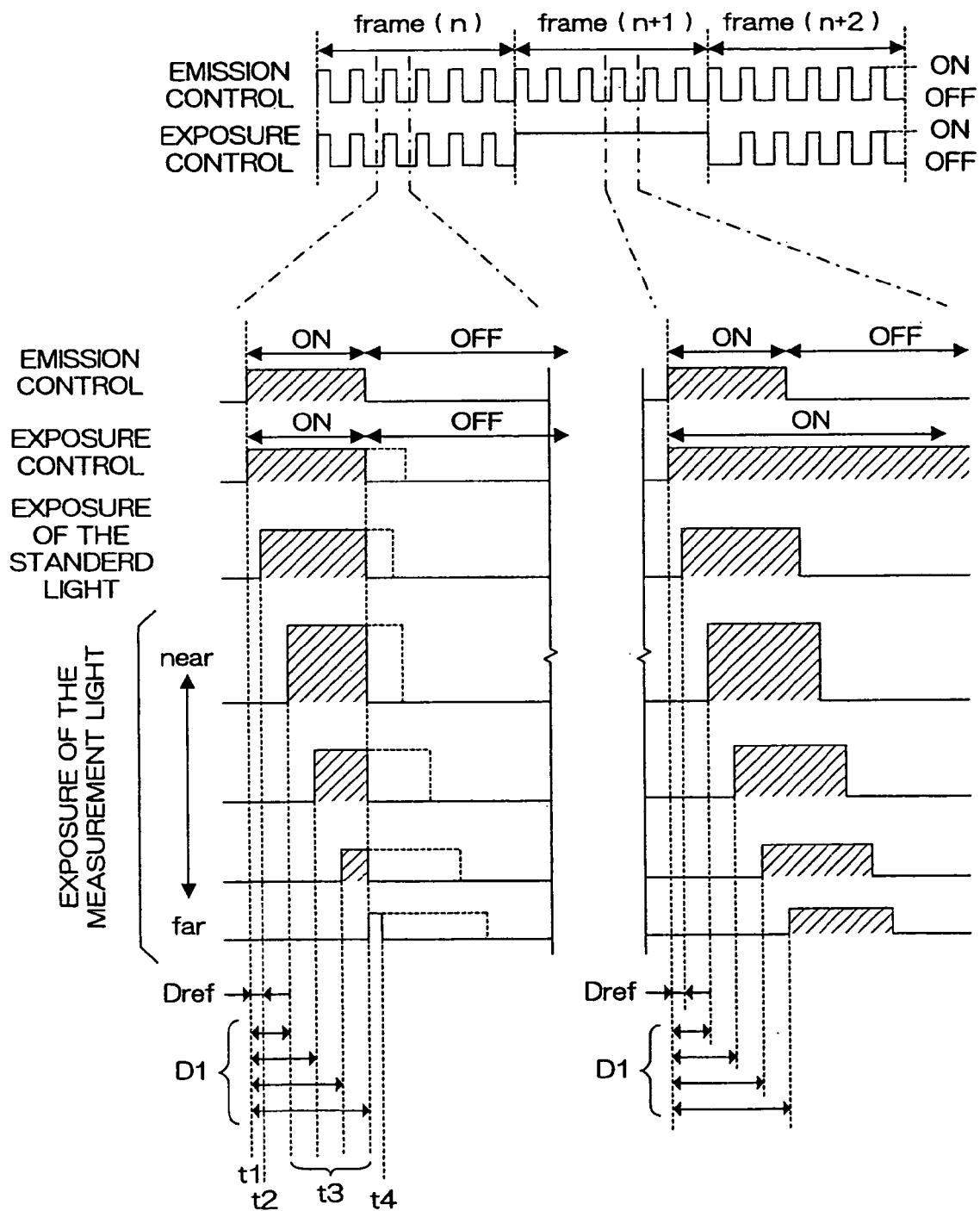
FIG. 2 illustrates the measurement principle.

FIG. 2 illustrates the measurement principle.

The light source intermittently emits light in accordance with light-emission control signals which repeatedly and alternatingly switch ON/OFF the light emission in regular periods. The exposure light of the solid state area sensor is an intermittent exposure light synchronized with the light emission timing in frame (n). Although the light emission timing and the exposure timing match completely in the drawing, the timing also may be shifted insofar as they are synchronized, and the length of the period (pulse width) may be slightly different for the emission light and the exposure light.

In the present invention, "sensor exposure light" refers to the light exposure when the sensor is in the active state. "Sensor exposure light" does not include light exposure when the sensor is in the inactive state. Accordingly, "exposure control" in the present invention refers to control of the sensor active/inactive timing.

At time t1, part of the emitted light (standard light) is propagated through the internal optical path and impinges the standard pixel. The incidence of the standard light starts from time t2 after a time Dref has elapsed which matches an emission delay time (offset time) from time t1 and the time for propagation within the internal optical path. The incidence of the measurement light from an object starts from time t3 after a time D1 has elapsed which matches the emission delay time from time t1 and the time for propagation in the external optical path. Since the exposure of the solid state area sensor also stops when the emission light stops at time t4, the amount of exposure of the measurement pixel in a single exposure is a value corresponding to the reflectivity of the object and the distance to the object. The chief cause of fluctuation in the amount of exposure dependent on the distance, in addition to the difference in exposure time due to the incidence delay, is the attenuation of the light intensity (i.e., intensity decreases with increasing distance). If the reflectivity of the object is known beforehand, it is possible to determine the distance based on the amount of exposure. The measurable distance is determined by the length of a single light emission period. Error can be reduced by determining the distance based on the total amount of exposure (accumulated electric charge) of one frame when light is projected and received a plurality of times within one frame period.

On the other hand, it is difficult in practice to know beforehand the reflectivity of each part of an object. In frame (n+1), there is continuous exposure light on the solid state area sensor. In this way the amount of exposure in frame (n+1) is mainly an amount corresponding to the reflectivity of the object (reflectivity data). Accordingly, distance data excluding the object reflectivity component from the distance data can be obtained by performing the following calculations for each pixel of the solid state area sensor.

Distance data=(distance data)÷(reflectivity data)=[image data of frame(n)]÷[image data of frame (n+1)].

Figure 3:
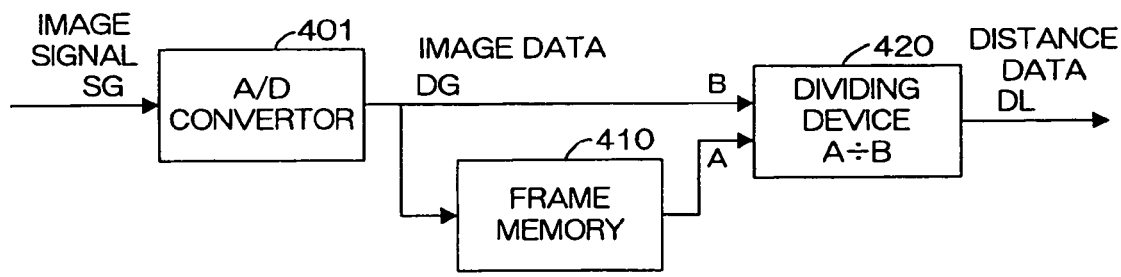
FIG. 3 shows the basic structure of the image processing circuit.

This calculation is performed by the image processing circuit 34 having the structure shown in FIG. 3.

The image signal SG transmitted from the solid state area sensor 22 is quantified by an AD converter 401, and output as image data DG.

The image data DG (distance data) of frame (n) are temporarily stored in a frame memory 410.

When the image data DG (reflectivity data) in frame (n+1) are output from the AD converter 401, the image data DG of frame (n) are simultaneously output from the frame memory 410, and a dividing device 420 performs the aforesaid calculation.

The effect of the emission delay time is excluded by the following correction calculation based on the distance data of the measurement pixel and the distance data of the standard pixel, and the distance from each measurement pixel to the object can be measured with greater accuracy.

Corrected distance data=(distance data of the measurement pixel)−(distance data of the standard pixel)

An image processing circuit 34 may be provided to perform this calculation function, or the calculation may be performed by the system controller 31.

Example of the Solid State Area Sensor

Either a CCD sensor, or MOS-type sensor may be used as the solid state area sensor 22.

Figure 4A:
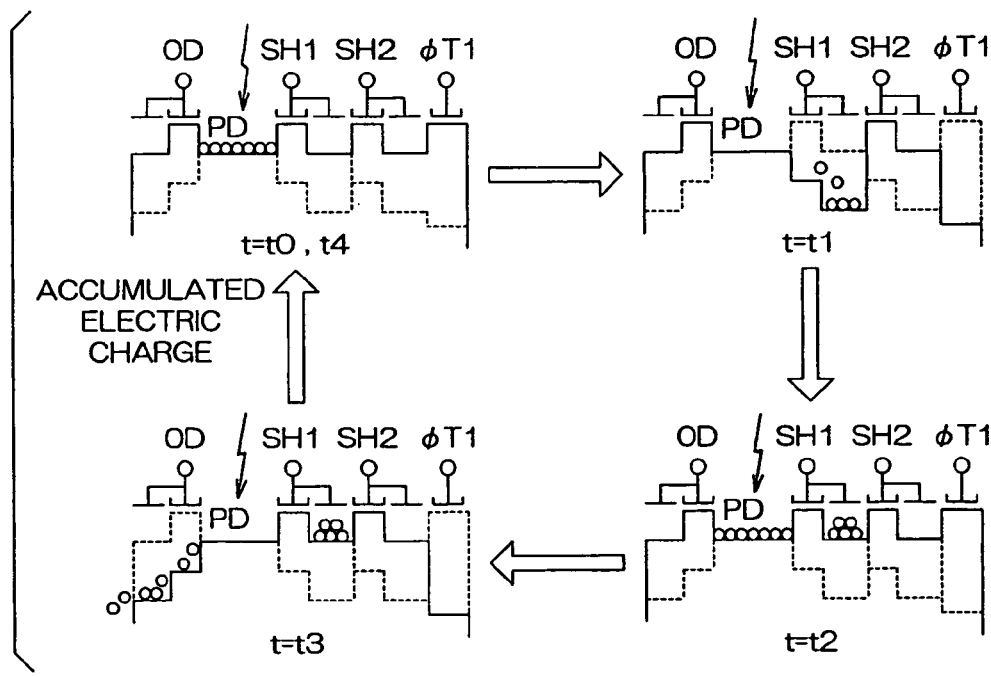
FIG. 4(*a*) and FIG. 4(*b*) illustrate the operation of the CCD sensor.
Figure 4B:
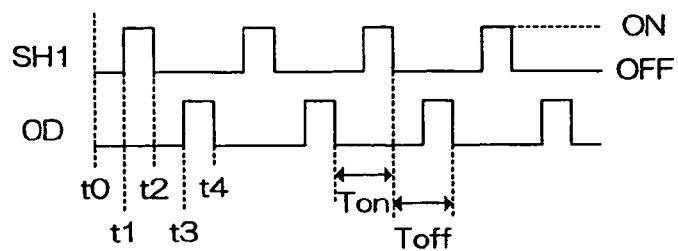

FIGS. 4(*a*) and 4(*b*) illustrate the operation of a CCD sensor. FIG. 4(*a*) schematically shows the structure, and FIG. 4(*b*) shows the control timing. The state of each time t0, t1, t2, t3, t4 is described below.

Figure 5:
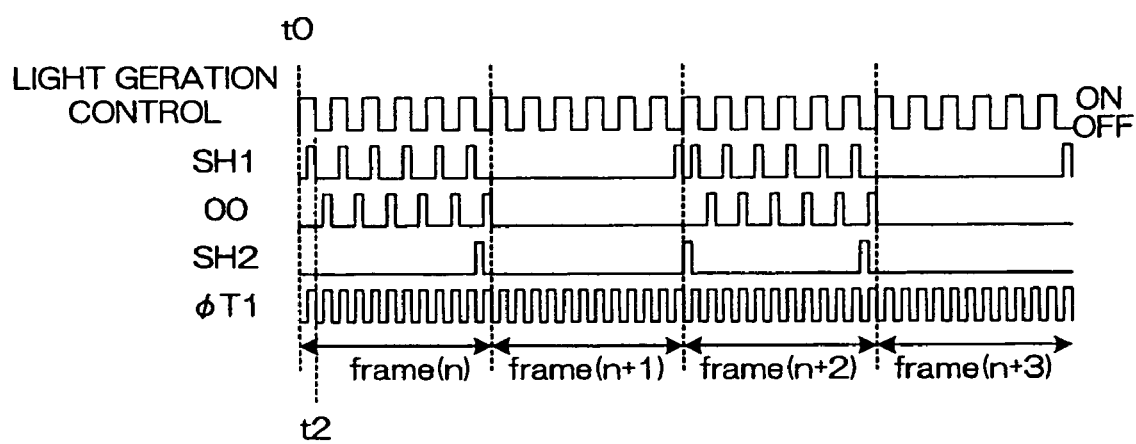
FIG. 5 is a signal waveform diagram showing the control of the projection and reception light when using a CCD sensor.

FIG. 5 is a signal waveform diagram showing the control of the projection and reception light when using a CCD sensor.

The operation of FIG. 4 is repeated to perform intermittent exposure in frame (n), and continuous exposure is performed in frame (n+1). The electric charge accumulated at gate SH1 in frame (n) is transferred to reverse gate φT1 when gate SH2 switches ON at the end of the frame, and is output to the image processing circuit 34 in parallel with the exposure operation of frame (n+1).

Figure 6A:
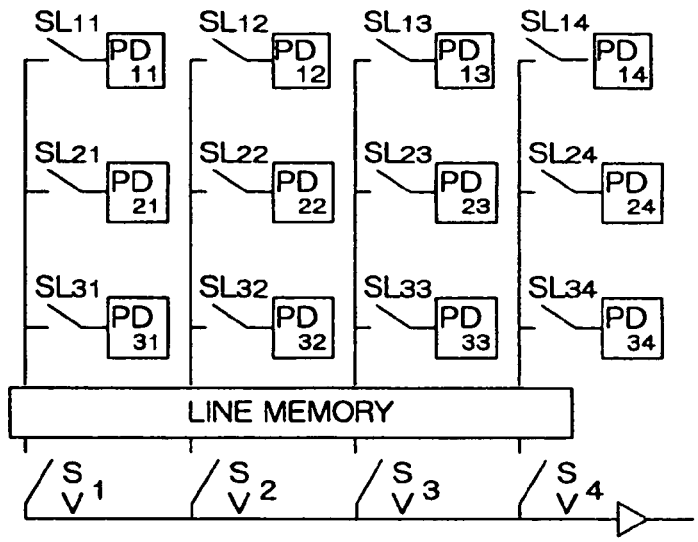
FIG. 6(a) and FIG. 6(b) illustrate the operation of a MOS-type sensor.
Figure 6B:
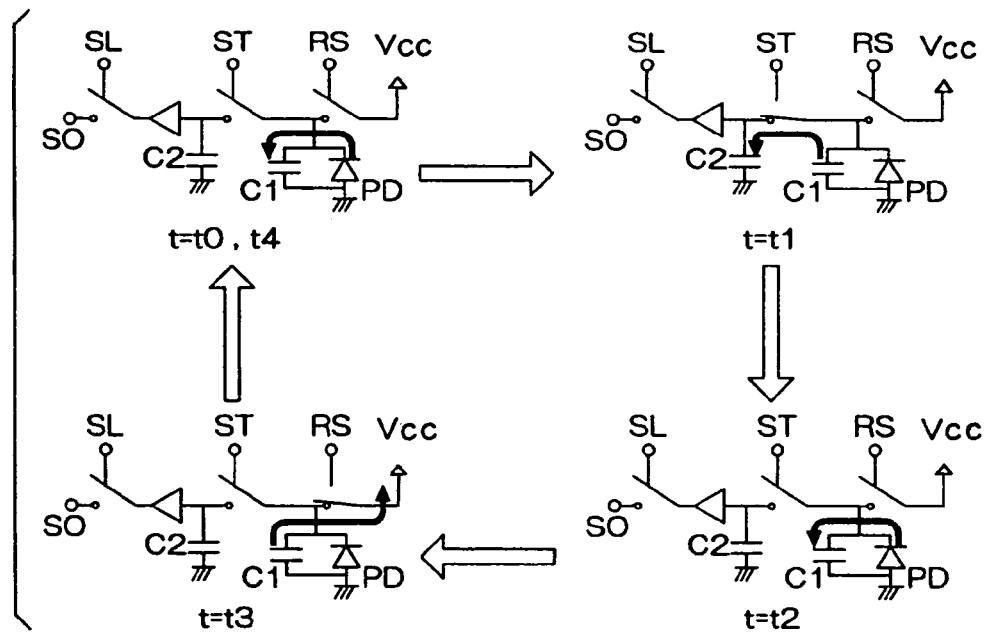
Figure 6C:
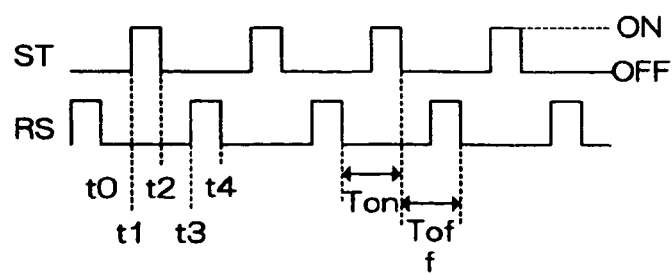

FIGS. 6(*a*) and 6(*b*) illustrate the operation of a MOS-type sensor. FIG. 6(*a*) summarizes the structure, FIG. 6(*b*) shows the movement of the electric charge, and FIG. 6(*c*) shows the control timing. The state times t0, t1, t2, t3, t4 is described below.

t0: Load starts accumulating at PD incidental capacitor C1.

t1: Gate ST switches ON, and the electric charge is transferred from incidental capacitor C1 to a sufficiently large capacity condenser C2.

t2: Gate ST switches OFF, and again electric charge starts accumulating in incidental capacitor C!.

t3: Gate RS switches ON, and the accumulated electric charge is discharged from the incidental capacitor C1 to the power line Vcc at periods t2–t3.

t4: Gate RS switches OFF, and electric charge again starts accumulating.

The photoelectrically converted electric charge gradually accumulates in period Ton in the condenser C2 by repeating the aforesaid operation. Since the incidental capacitor C1 is small compared to the condenser C2, the potential of the incidental capacitor C1 rises greatly by the electric charge accumulation. In this way, when gate ST switches ON, the electric charge is transferred from the incidental capacitor C1 to the condenser C2.

Figure 7:
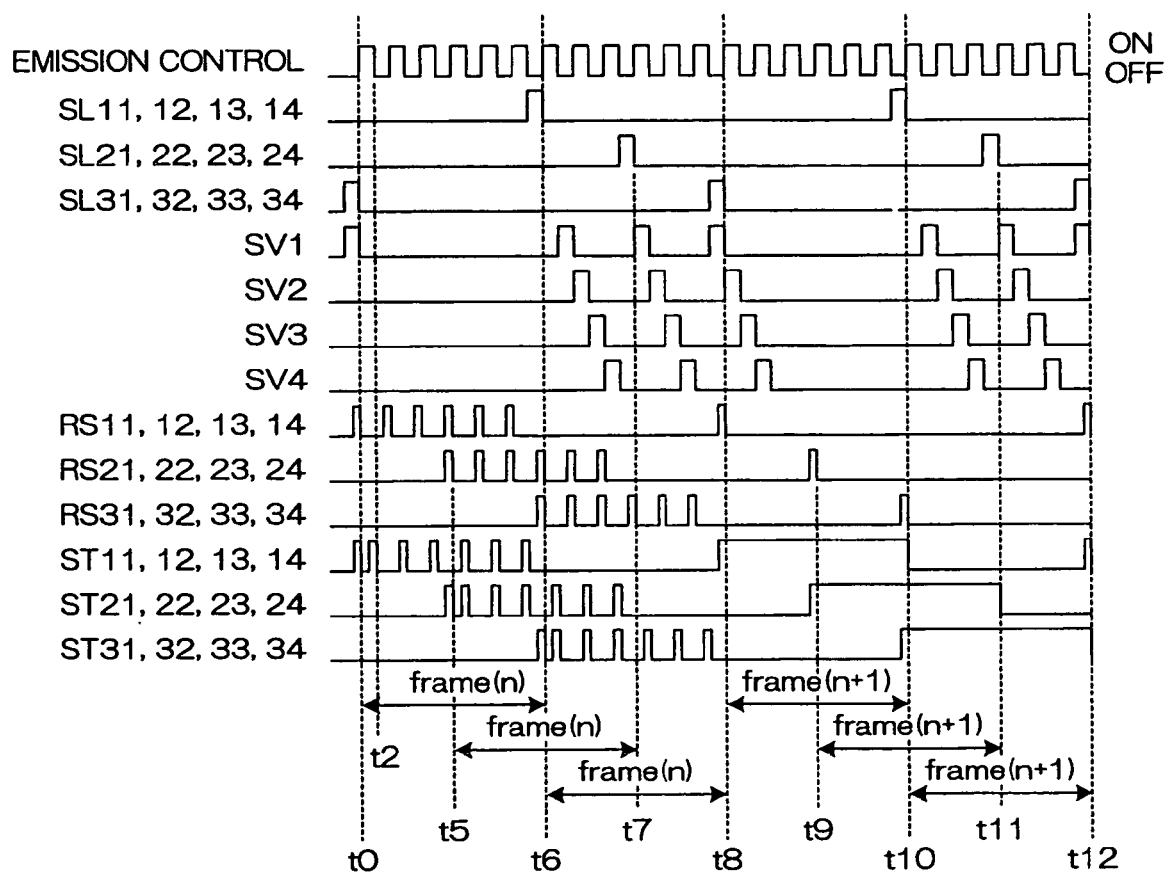
FIG. 7 is a signal waveform diagram showing the control of the projection and reception light when using a MOS-type sensor.

FIG. 7 is a signal waveform diagram showing the control of the projection and reception light when a MOS-type sensor is used.

In FIG. 7, frame (n) in PD11~PD14 shown in FIG. 6(*a*) corresponds to t0~t6, and frame (n+1) corresponds to t8~t10. Frame (n) in PD21~PD24 corresponds to t5~t7, and frame (n+1) corresponds to t9~t11. Frame (n) in PD31~PD34 corresponds to t6~t8, and frame (n+1) corresponds to t10~t12.

In frame (n), intermittent exposure is performed by repeating the operation of FIG. 6, and in frame (n+1) continuous exposure is performed. In frame (n), the electric charge stored in the condenser C2 switches ON the gates SL11~SL14 at the end of the frame, such that signals corresponding to the electric charges of PD11~PD14 are stored in a line memory. The signals of the PD11~PD14 stored in the line memory are output to the image processing circuit 34 by sequentially switching ON the switches SV1~SV3.

Next, the signals of PD21~PD24 are similarly output, and finally when the signals of PD31~PD34 are similarly stored in the line memory. the continuous exposure of frame (n+1) starts with PD11~PD14, and the signals of PD31~PD34 are output in parallel with the continuous exposure.

Counteracting Environmental Light

Since environmental light is not dependent on the distance to the object, the impingement of environmental light on the solid state area sensor is a source of measurement error. As a countermeasure for environmental light, an optical filter is used to selectively transmit light of the wavelength range emitted by the light source. However, environmental light cannot be entirely eliminated by the optical filter. In the embodiments described below, measurement error due to environmental light is prevented.

Figure 8:
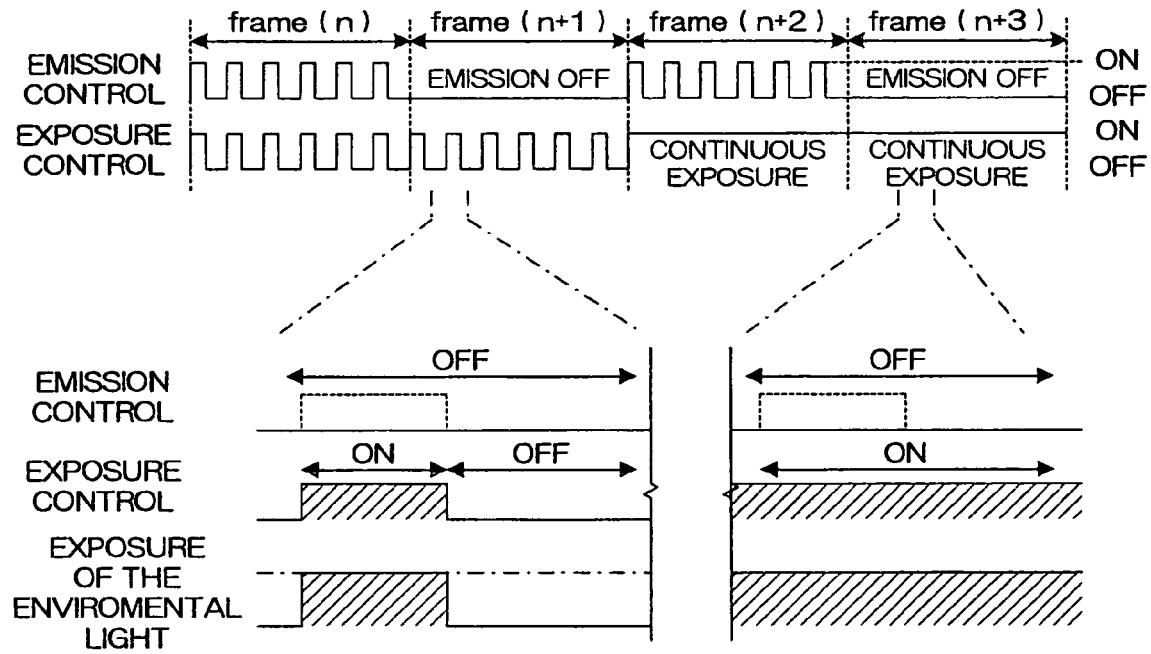
FIG. 8 is a signal waveform diagram showing a first modification of the control.

FIG. 8 is a signal waveform diagram showing a first modification of the control.

In frame (n), intermittent light emission is performed, an intermittent exposure is performed with a timing identical to the emission timing.

The environmental light component in the exposure light of frame (n) is detected by intermittent exposure without light emission in frame (n+1).

Intermittent emission and continuous exposure are performed in frame (n+2) to obtain reflectivity data.

The environmental light component in the exposure light of frame (n) is detected by intermittent exposure without light emission in frame (n+1).

Then, the environmental light component in the exposure light of frame (n+2) is detected by continuous exposure without emission in frame (+3).

Figure 9:
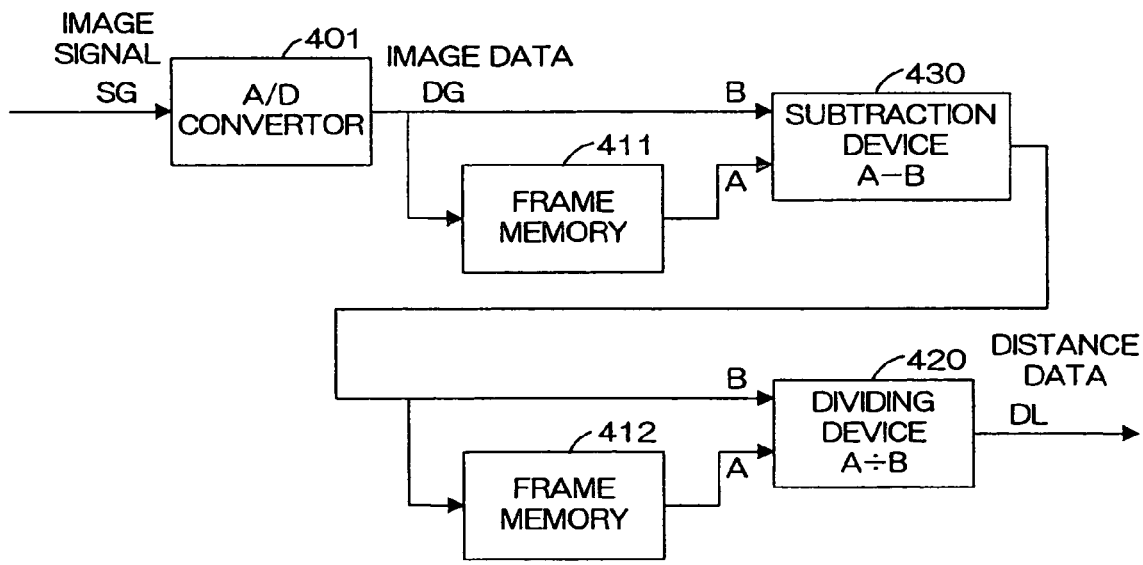
FIG. 9 is a block diagram showing a first modification of the image processing circuit.

FIG. 9 is a block diagram showing a first modification of the image processing circuit.

In the image processing circuit 34*b*, the image data SG transferred from the solid state area sensor 22 are quantified by the AD converter 401 and output as image data DG similar to the case shown in FIG. 3.

The image data DG (distance data) in frame (n) are temporarily stored in line memory 411.

When the image data (intermittent exposure and environmental light data) of frame (n+1) are output from the AD converter 401, the image data DG of frame (n) are output simultaneously with the image data DG of frame (n+1) from the frame memory 411. Distance data from which the environmental light component has been eliminated are obtained by calculation by a subtraction device 430. The output of the subtraction device 430 is temporarily stored in the frame memory 412. Furthermore, the image data DG (reflectivity data) of frame (n+2) are recorded in the frame memory 411 in parallel with the readout.

When the image data DG (continuous exposure environmental light data) of frame (n+3) are output from the AD converter 401, the reflectivity data are read from the frame memory 411, and the reflectivity data excluded from the environmental light component are output from the subtracting device 430. Then, distance data DL from which the environmental light component has been excluded are obtained by the calculation of the dividing device 420.

Enlargement of the Measurable Distance Range

In the method of controlling the exposure timing and measuring distance using the amount of reflected exposure light, basically long distances wherein the time of flight is longer than the emission time (emission pulse width) cannot be measured. Long distances can be measured in the embodiments described below.

Figure 10A:
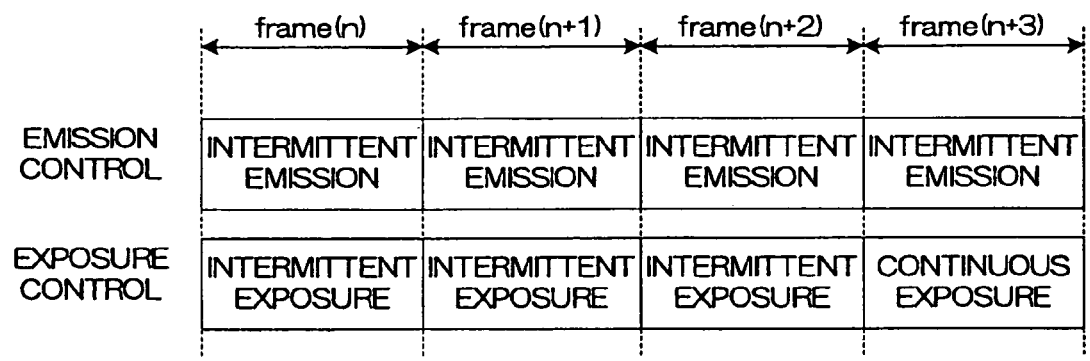
FIG. 10(a) and FIG. 10(b) show a second modification of the control.
Figure 10B:
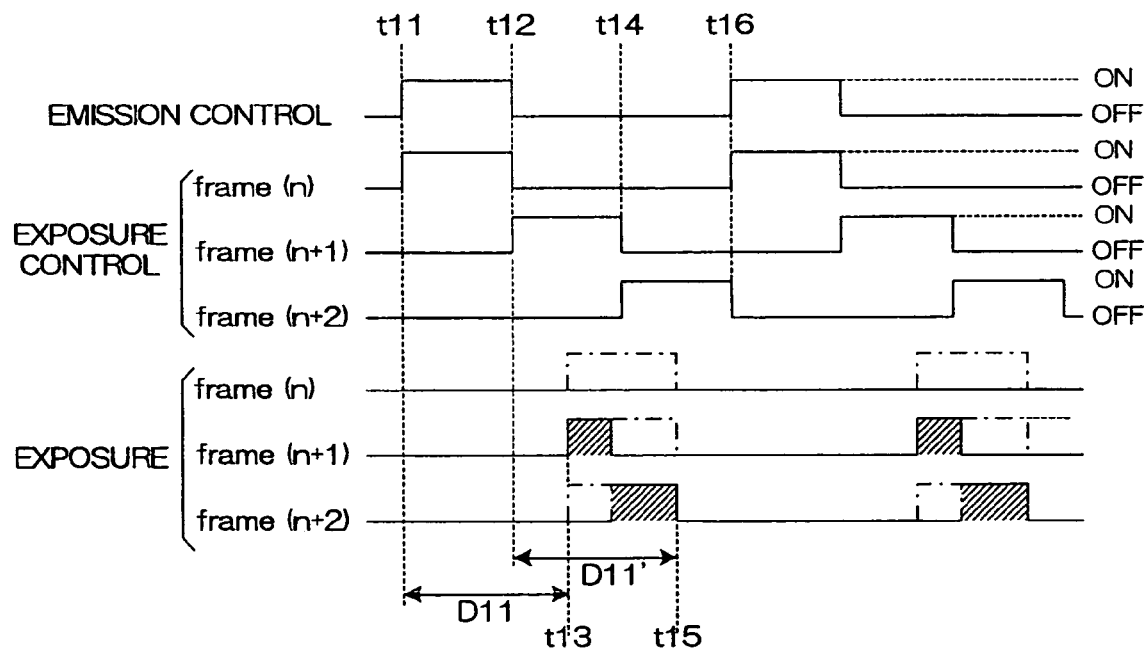

FIGS. 10(a) and 10(b) show a second modification of the control.

In frame (n), intermittent emission is performed, and intermittent exposure is performed with the same timing as the emission. In frame (n+1), intermittent emission is performed and intermittent exposure is performed with a timing delayed by the exposure time relative to frame (n). In frame (n+2), intermittent emission is performed, an intermittent exposure is performed with a timing delayed by the exposure time of frame (n+1). Then, in frame (n+3), intermittent emission and continuous exposure are performed to obtain reflectivity data.

For example, when the impingement of the measurement light starts from time t3 in the exposure period (t12~t14) of frame (n+1) shown in the drawing, distance data corresponding to the propagation time D11 and D11' representing the distance to the object are obtained for both frame (n+1) and frame (n+2). These distance data are distance data from which the reflectivity component has been excluded by division of the reflectivity data of frame (n+3). The distance data obtained in frame (n+1) and the distance data obtained in frame (n+2) are averaged to determine the distance data of each pixel.

Since the light returning from the object within the emission period from one emission to the next emission is always received by setting the exposure timing to be mutually shifted from frame to frame, the measurable distance, when viewed from the time of flight, is increased from the emission period to the emission OFF time of the emission cycle. The time D11 from the transmission pulse rise to the reception pulse rise (hereinafter referred to as "rise time difference") and the time D11" from the transmission pulse fall to the reception pulse fall (hereinafter referred to as "fall time difference") are measured, and their average is designated the measurement value, so as to produce a highly accurate measurement.

Figure 11:
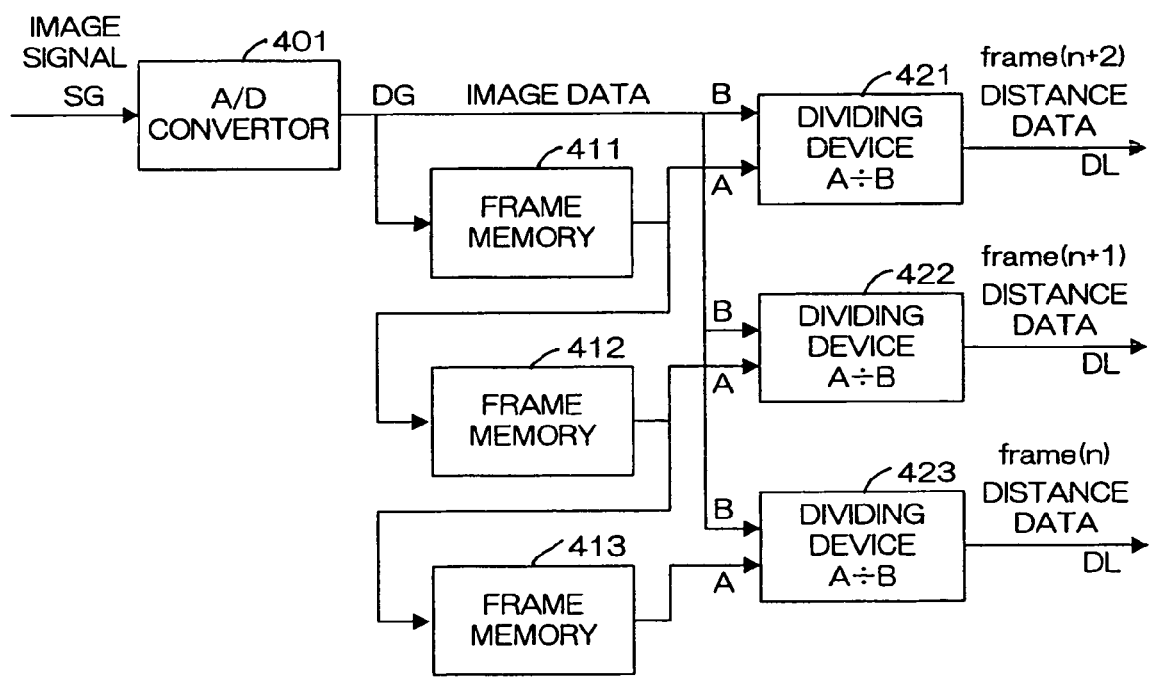
FIG. 11 a block diagram showing a second modification of the image processing circuit.

FIG. 11 is a block diagram showing a second modification of the image processing circuit.

In the image processing circuit 34c, the image signal SG output from the solid state area sensor 22 is converted to image data DG by the AD converter 401, and sequentially recorded in frame memories 411, 412, 413 for each frame. When the image data DG of frame (n+3) are output from the AD converter 401, the image data DG of frame (n+2) are output from frame memory 411, and the image data DG of frame (n+1) are output from the frame memory 412, and the image data DG of frame (n) are output from frame memory 413. The pixel unit division of the image data DG output from each frame memory 411, 412, 413 and the image data DG of frame (n+3) output from the AD converter 401 is performed by the dividing devices 421, 422, 423, and the distance data DL are calculated for each frame (n)~(n+2). Three-dimensional data are calculated based on the distance data DL of these three frames. The system controller 31 performs the calculations.

When performing the three-dimensional data calculations, data of two frames representing the propagation times D11 and D11' are selected from the distance data DL of the three frames. A description of this portion of the process follows below.

Figure 12:
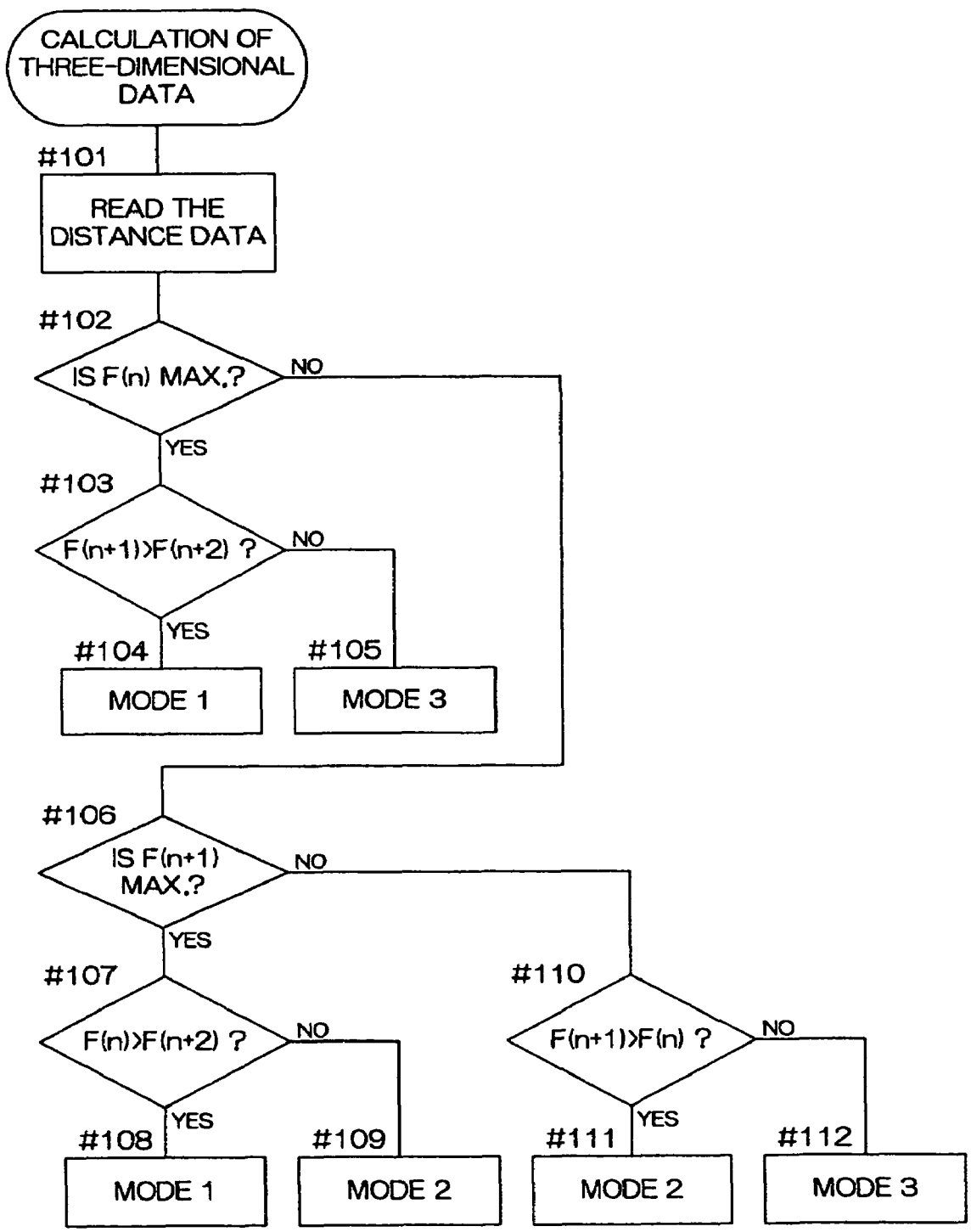
FIG. 12 is a flow chart of the mode discrimination related to three-dimensional data calculation.
Figure 13:
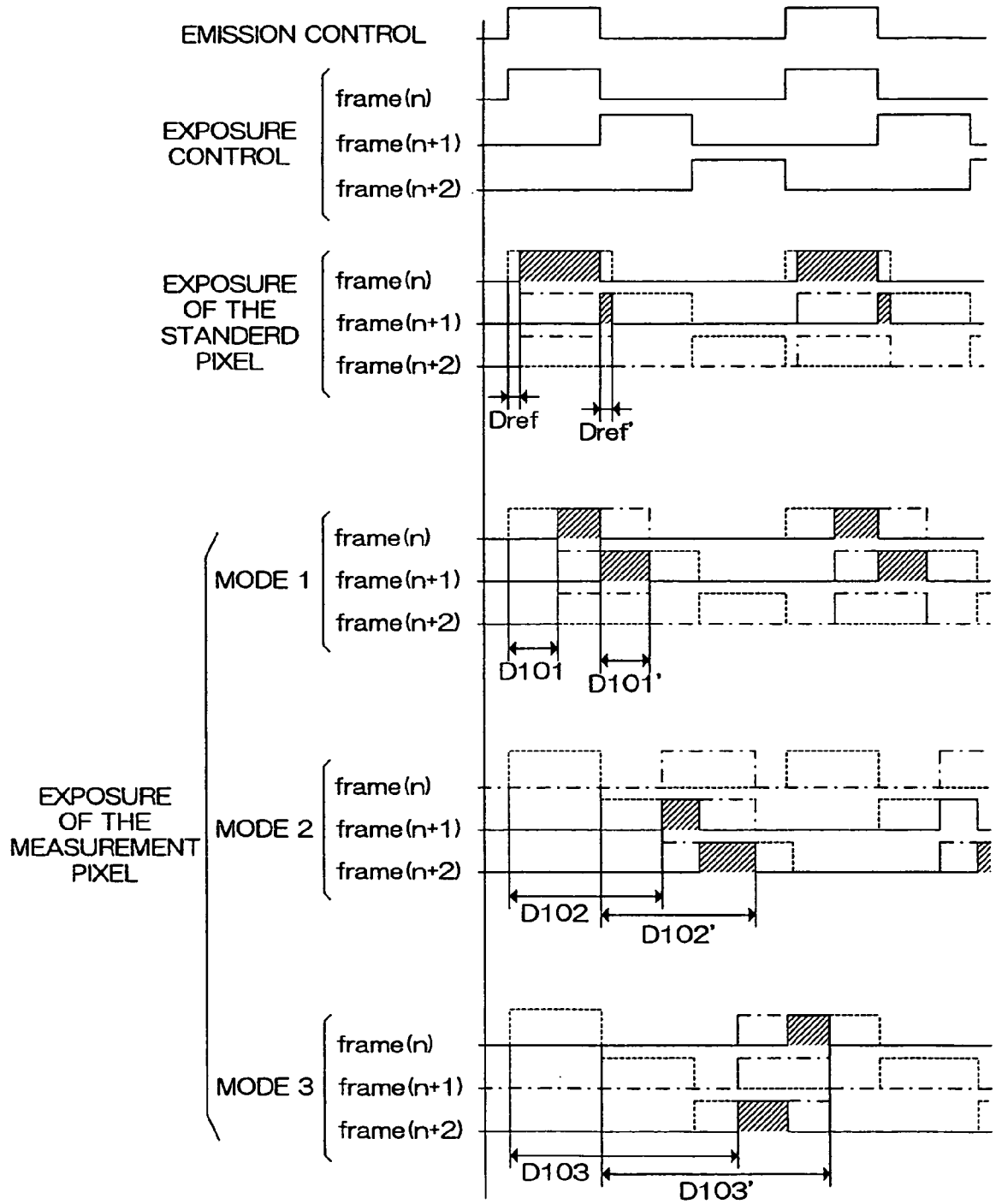
FIG. 13 is a waveform diagram showing the relationship among the three mode types and light receiving time.

FIG. 12 is a flow chart of the mode discrimination for calculating three-dimensional data, and FIG. 13 is a waveform diagram showing the relationship between the three modes and light receiving times. In FIG. 12, "frame" is represented by the symbol "F."

The system controller 31 reads the distance data of frames (n)~(n+2) obtained by sensing frames (n)~(n+3) from the frame memory 35 (#101). Then, the magnitude relationship of the distance data values in frames (n)~(n+2) are determined for each pixel, and calculations are performed for either mode 1, 2, or 3 in accordance with the determined relationship (#102~#112).

As shown in FIG. 13, in the standard pixel, the distance data of frame (n) represents the rise time difference Dref, and the distance data of frame (n+1) represents the fall time difference Dref'. The propagation time in the internal optical path is sufficiently shorter compared to the emission pulse width. Accordingly, the distance data of frame (n) and frame (n+1) are normally used in the calculation of the standard pixel. The determination of modes 1, 2, and 3 may be performed for the standard pixel just as for the measurement pixel, and the distance data selected based on the result.

In mode 1, the distance data of frame (n) represents the rise time difference D101, and the distance data of frame (n+1) represents the fall time difference D101'. Accordingly, the distance data of frames (n) and (n+1) are used in this calculation. The corrected distance data representing D101-Dref and D101' -Dref' are obtained by subtracting the standard pixel data of the same frame from each frame. The average of the corrected distance data is designated the distance data of the measurement pixel determined in mode 1.

Similarly, in mode 2 the distance data of frames (n+1) and (n+2) are used, and calculation of corrected distance data representing D102-Dref and D102'-Dref' as well as the average value calculation are performed. In mode 3 the distance data of frames (n) and (n+2) are used, and calculation of corrected distance data representing D103-Dref and D103'-Dref' as well as the average value calculation are performed.

Figure 14A:
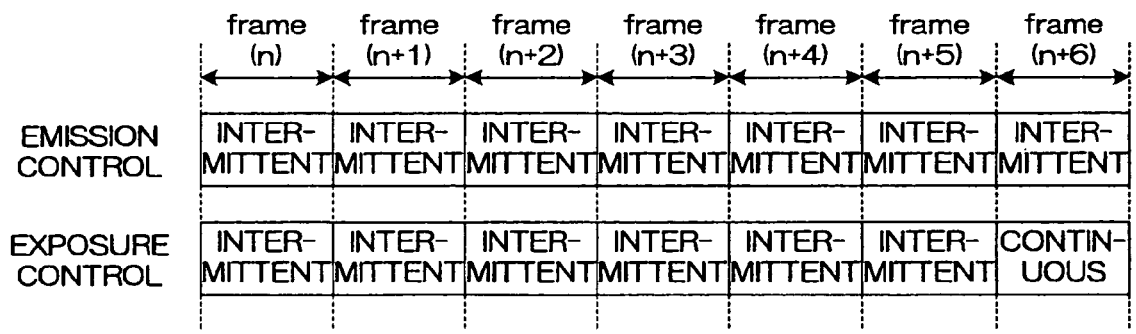
FIG. 14(a) and FIG. 14(b) show a third modification of the control.
Figure 14B:
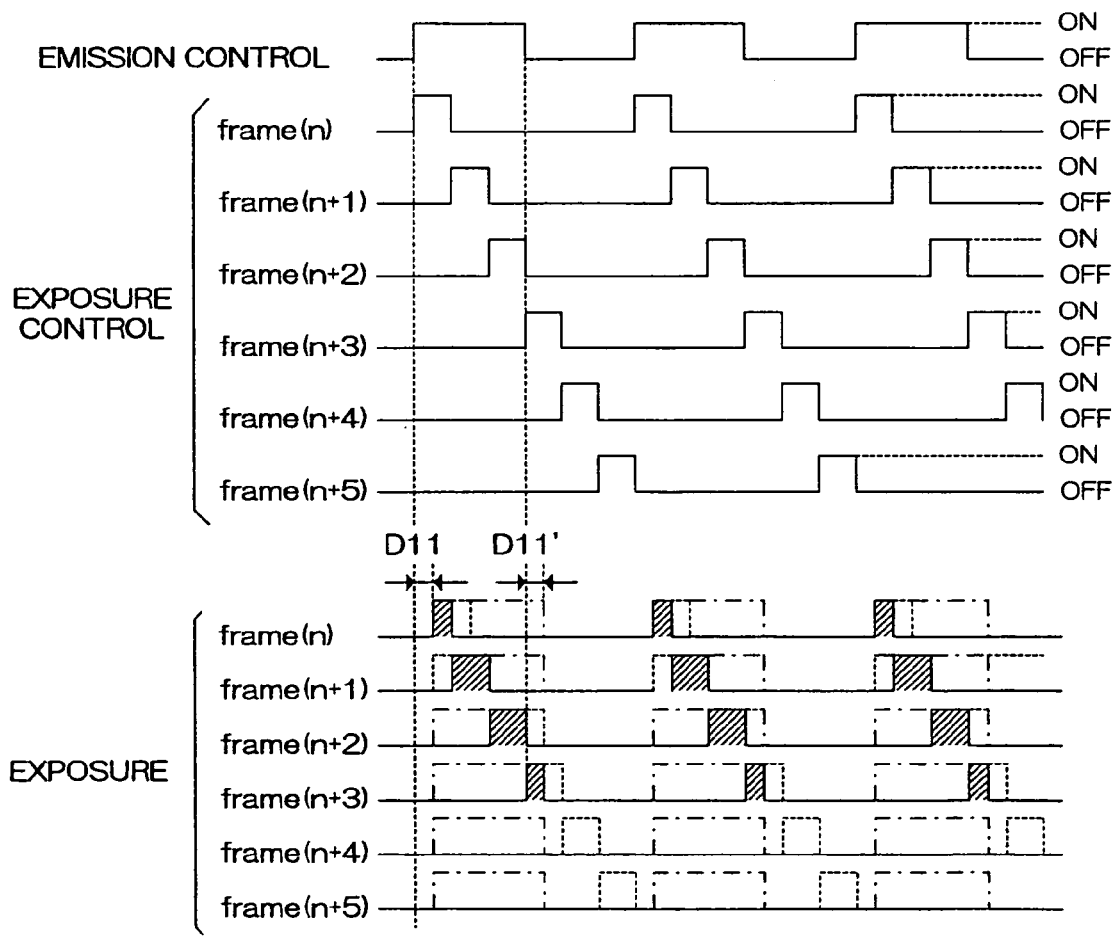

When measuring long distance as described above, it is possible to increase resolution to achieve high accuracy measurement by shifting the exposure timing between frames so as to have the exposure period of each frame shorter than the emission time as shown in FIG. FIGS. 14(a) and 14(b), and perform a plurality of exposures in the emission period (pulse light projection period) with the assumed appearance of simultaneously of a plurality of frames. In the example shown in FIGS. 14(a) and 14(b) the distance data of frame (n) representing the rise time difference D11 and the distance data of frame (n+3) representing the fall time difference D11' are used to determine the distance value.

The influence of environmental light can be reduced even when measuring long distances.

FIG. 15 shows a summary of a fourth modification of the control.

Intermittent emission is performed in frames (n)~(n+2), and intermittent exposure is performed with the same or delayed timing of emission. In frame (n+3) the emission is stopped and intermittent exposure is performed to obtain environmental light data. In frame (n+4) intermittent emission and continuous exposure are a performed to obtain reflectivity data. In frame (n+5) emission is stopped, and continuous exposure is performed.

Figure 16:
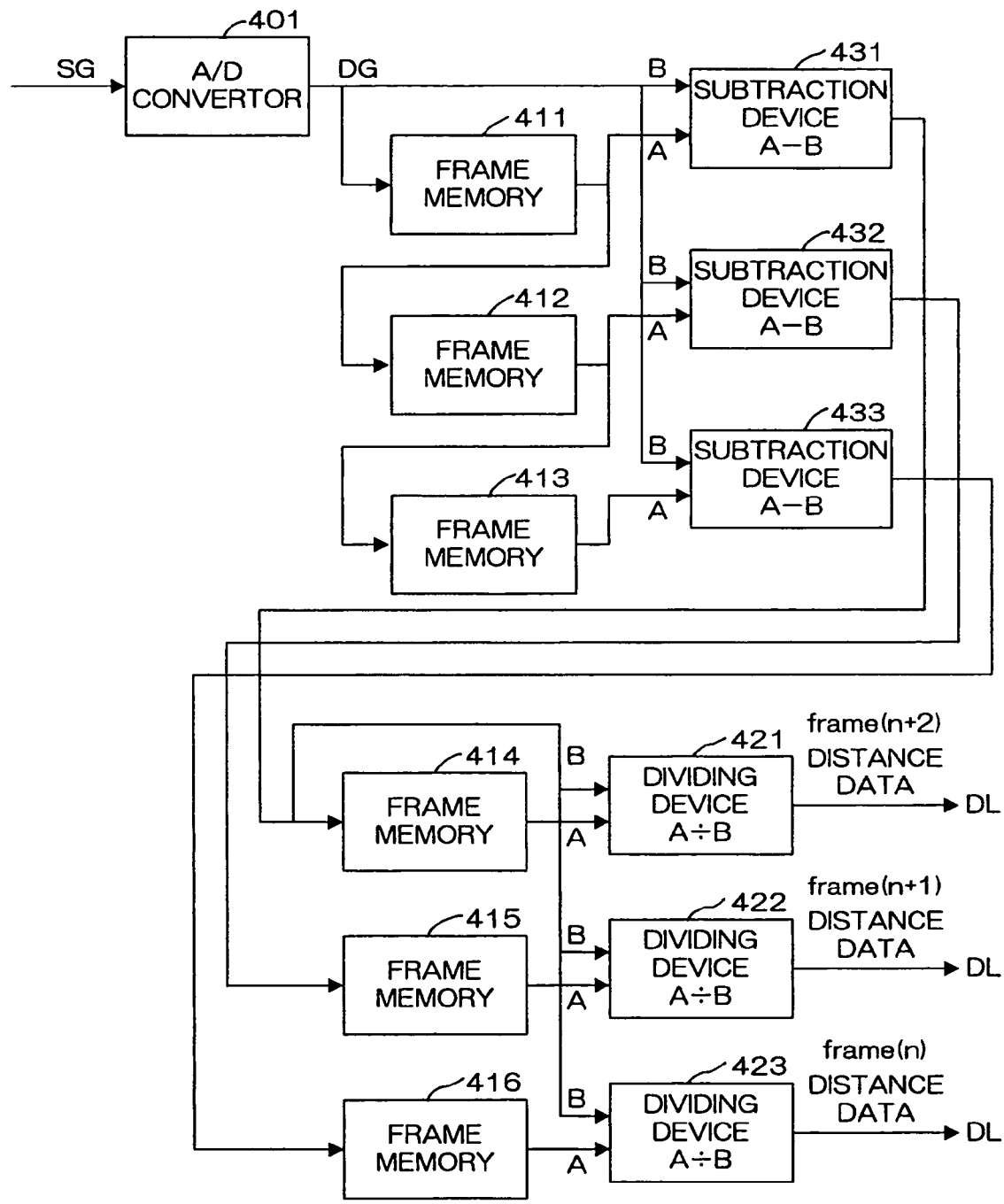
FIG. 16 is a block diagram showing a third modification of the image processing circuit.

FIG. 16 is a block diagram showing a third modification of the image processing circuit.

In the image processing circuit 34d, the distance data DG of frames (n+2), (n+1), (n) are stored in frame memories 411, 412, 413. When the environmental light data of frame (n+3) are output from the AD converter 401, data are simultaneously read from the frame memories 411~413, and the environmental light component is eliminated by the subtraction devices 431 and 432. The distance data of the frames (n+2), (n+1), (n) from which the environmental light component has been eliminated are recorded in frame memories 414, 415, 416.

Then, the reflectivity data of frame (n+4) are stored in frame memory 411, and when the environmental light data of frame (n+5) are output from the AD converter 401, the environmental light component is eliminated from the reflectivity data of frame (n+4) by the subtraction device 431. Data are read from the frame memories 414~416 simultaneously with the output of data from the subtraction device 431, and the distance data DL of frames (n+2), (n+1), (n) from which the environmental light component has been eliminated are obtained via calculation by the dividing devices 431, 432, 433.

Other Examples of Optical Systems

Figure 17A:
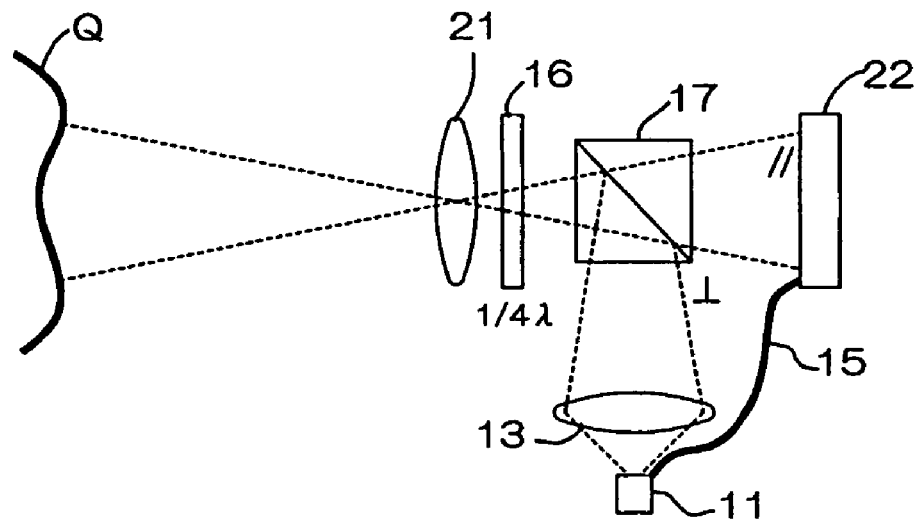
FIG. 17(a) and FIG. 17(b) show modifications of the optical system.
Figure 17B:
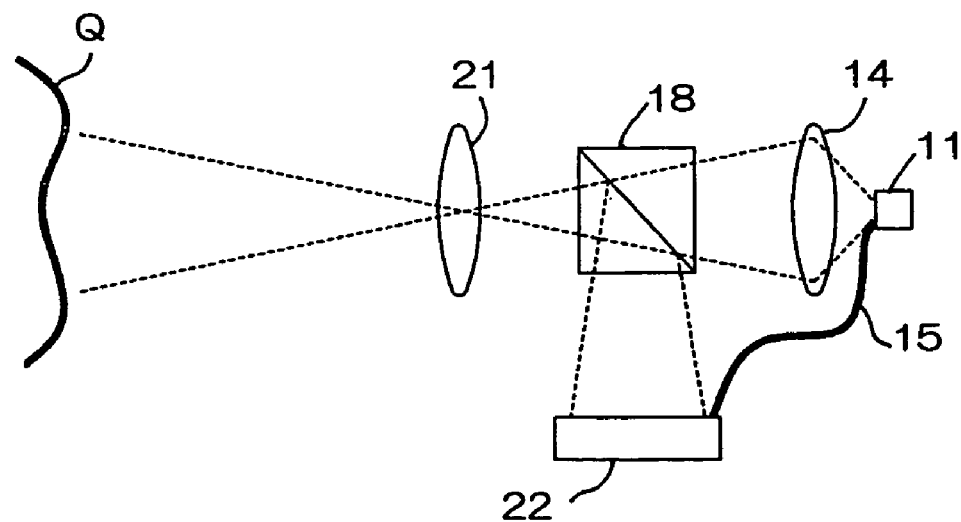

FIGS. 17(a) and 17(b) show modifications of the optical system. Structural elements of the example in these drawings are designated by symbols identical to those of FIGS. 1(a) and 1(b).

In the structure of part (a), light emitted from the light source 11 is condensed to the principal point of the receiving lens 21 by the collector lens 13 and polarization mirror 17, so as to be directed to the object Q. The light reflected by the object Qv passes through the receiving lens 21, ¼ wavelength plate 16, and polarization mirror 17, and impinges a specific pixel on the solid state area sensor 22. The polarization mirror 17 reflects the perpendicular polarized light, and transmits the parallel polarized light. The ¼ wavelength plate 16 inclines the polarized light 45 degrees.

In the structure of part (b), the light emitted from the light source 11 is condensed at the principal point of the receiving lens 21 by the collector lens 14 and semi-transparent mirror 18, and directed to the object Q. The light reflected from the object Q passes through the receiving lens 21 and semi-transparent mirror 18, and impinges a specific pixel on the solid state area sensor 22.

Second Embodiment

Laser light is most suitable as the signal medium in distance measurement using the TOF method. However, since measurement of light propagation time is an event performed at high speed, it is difficult to ensure high accuracy at near-field distances. measurement of constant precision can be realized regardless of whether the distance is near-field or not by using the TOF method and the triangulation method.

Device Construction

FIG. 18 shows the structure of a three-dimensional measurement device of the second embodiment.

The three-dimensional measurement device 2 has, in addition to the structural elements of the three-dimensional measurement device 1 shown in FIG. 1, a triangulation density gradient filter 19, filter controller 38, and mode switch 39.

The function of the density gradient filter 19 is variable, an includes projecting a first light and a second light having different luminous intensity distributions, and a substantially through-like state (uniform luminous intensity distribution). The mode switch 39 is a user interface for specifying the selection of the far-field mode and near-field mode by a user. The mode is not limited to manual selection and may be switched automatically by detecting the distance using a simple rangefinding sensor. The system controller 37 issues specific instructions to the filter controller 38 in accordance with a mode selection signal Sm output from the mode switch 39.

When the far-field mode is specified, the density gradient filter 19 is controlled so as to uniformly illuminate the object Q, and distance measurement is performed using the TOF method in the same manner as the three-dimensional measurement device 1. When the near-field mode is specified, the operation is as described below.

Near-field Mode Operation

Figure 19A:
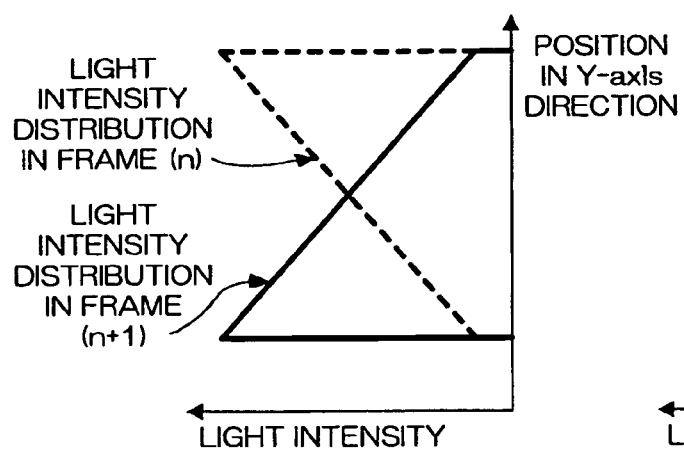
FIG. 19(a) and FIG. 19(b) illustrate the measurement principle of the short distance mode.
Figure 19B:
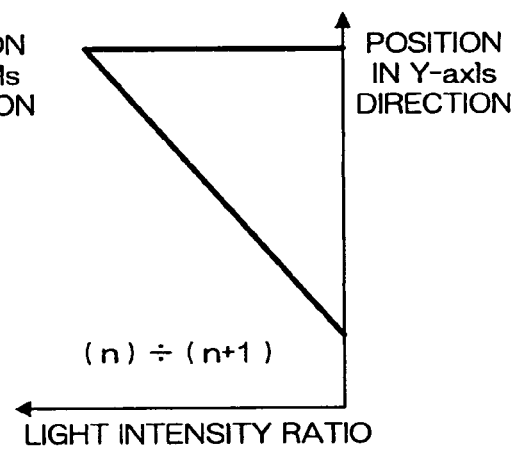
Figure 19C:
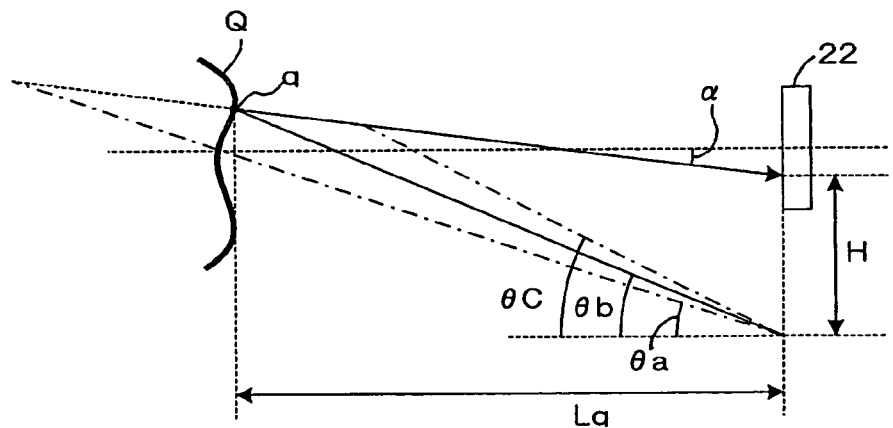

FIGS. 19(a) and 19(b) illustrate the measurement principle of the near-field mode.

As shown in Part (a), the characteristics of the density gradient filter 19 change the amount of light along one direction (Y direction) in a plane perpendicular to the optical axis.

In frame (n), light is projected using the density gradient filter 19, and continuous exposure light is sensed. Then, in frame (n+1), the density gradient filter 19 is rotated 180° about the optical axis, and the exposure light is sensed. In this way, the projection light intensity ratio of frame (n) and frame (n+1) differs at all angles using the optical axis as standard as shown in part (b).

The distance H between each pixel of the solid state area sensor 22 and the light source, and the incidence angle α of the light received by each pixel are known, and the relationship of correspondence between the projection light intensity ratio and the ray angles θa, θb, θc . . . are also known. Accordingly, the angle of the ray illuminating point q (angle θb in the example) on the object corresponding to a specific pixel can be understood by determining the intensity ratio of the incident light in frames (n) and (n+1) of that specific pixel. The distance Lq to the point q can be calculated by triangulation. The division calculation for obtaining the light intensity ratio is performed by the image processing circuit 34, and the distance calculation for each pixel is performed by the system controller 37. The obtained distance data are recorded and displayed.

In the first and second embodiments, a solid state area sensor 22 capable of sensing color may be used, so as to perform three-dimensional measurement and two-dimensional color image input, both of which may be recorded and displayed. Although the operation has been described in terms of obtaining a single three-dimensional image, the measurement may be repeated so as to have three-dimensional measurement of a three-dimensional object. The solid state area sensor may also be used to perform a logarithmic compression function.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A three-dimensional measurement method for measuring a distance to a plurality of positions on an object by projecting light and receiving light reflected from the object, said three-dimensional measurement method comprising the steps of:
   projecting a light on the object;
   receiving light reflected from the object by an area sensor comprising a plurality of photoelectric conversion elements;
   controlling the active/inactive timing of the area sensor such that an electric charge photoelectrically converted by the plurality of photoelectric conversion elements is accumulated with a timing synchronously with the light projection; and
   measuring the distance to each photoelectric conversion element based on the output of the area sensor,
   wherein changing said active/inactive states of the area sensor is performed a plurality of times in one accumulating period of the area sensor.

2. The three-dimensional measurement method according to claim 1, wherein
   the distance to said each photoelectric conversion element is measured based on the output of the area sensor when the active/inactive timing of the area sensor is controlled such that the amount of exposure of the area sensor is dependent on the light propagation time in a time frame, and
   in a separate time frame the area sensor is controlled such that the amount of exposure of the area sensor is independent of the light propagation time.

3. The three-dimensional measurement method according to claim 1, wherein the period of the projected pulse light matches the period of the exposure of a respective photoelectric conversion element.

4. The three-dimensional measurement method according to claim 1, wherein a plurality of exposures are obtained by different timings in a single projection.

5. The three-dimensional measurement method according to claim 1, wherein a plurality of the exposures are obtained within a period of pulse light projection.

6. A three-dimensional measurement device for measuring the distance to a plurality of positions on an object by projecting light and receiving the light reflected from the object, said three-dimensional measurement device comprising:
   a projector for projecting pulse light on the object;
   an area sensor comprising a plurality of photoelectric conversion elements for receiving light reflected from the object;
   a controller for controlling ON/OFF states of the plurality of photoelectric conversion elements with a timing synchronized with the pulse light projection to obtain at least two frame images, the ON/OFF states are activated a plurality of times in one accumulating period of the area sensor; and
   a processor for eliminating the fluctuating component of the received light intensity due to distance or reflectivity of the object from the amount of exposure obtained based on the control of the ON/OFF states by use of the at least two frame images.

7. The three-dimensional measurement device according to claim 6, further comprising an internal optical path for directing the pulse light from the projector to at least one photoelectric conversion element in the area sensor, wherein the measurement value is corrected in accordance with the amount of exposure of the area sensor by the pulse light propagated through the internal optical path.

8. The three-dimensional measurement device according to claim 6, further comprising an optical unit capable of switching the luminance distribution within the range projected by the projector so as to sequentially project light of a first luminance distribution and light of a second luminance distribution on the object, wherein
   the three-dimensional device is provided an operation mode for measuring the distance to each photoelectric conversion element based on the output of the area sensor in a first projection and the output of the area sensor in a second projection.

9. The three-dimensional measurement device according to claim 6, wherein control of the ON/OFF of the plurality of photoelectric conversion elements is accomplished differently for each line of the area sensor.

10. The three-dimensional measuring apparatus according to claim 6, wherein the controller controls the ON/OFF states in a different manner in different frames.

11. A three-dimensional measurement method for measuring a distance to a plurality of positions on an object by projecting light and receiving light reflected from the object, said three-dimensional measurement method comprising the steps of:
    projecting a light on the object with a projector;
    receiving light reflected from the object by an area sensor comprising a plurality of photoelectric conversion elements;
    controlling the projector to emit light a plurality of times periodically during one accumulating period of the area sensor and controlling periodic ON/OFF states of the plurality of photoelectric conversion elements a plurality of times during said one accumulating period with a timing synchronized with the periodical emitting of light from the projector; and
    measuring the distance to each photoelectric conversion element based on the output of the area sensor.

12. A three-dimensional measurement method for measuring a distance to a plurality of positions on an object by projecting light and receiving light reflected from the object, said three-dimensional measurement method comprising the steps of:
    projecting a light on the object with a projector;
    receiving light reflected from the object by an area sensor comprising a plurality of photoelectric conversion elements;
    controlling the projector to emit light and ON/OFF states of the plurality of photoelectric conversion elements synchronously with the emitting of the projector; and
    measuring the distance to each photoelectric conversion element based on the output of the area sensor, wherein
    said area sensor includes two gates in said each photoelectric conversion element for controlling an electric charge photoelectrically converted by said each photoelectric conversion element, the ON/OFF states of said two gates are activated alternately, and
    the ON/OFF states of said two gates are controlled a plurality of times during one accumulating period of the area sensor.

13. The three-dimensional measurement method according to claim 12, wherein
    the step of projecting the light on the object includes sequentially projecting light of a first luminance distribution which is uneven distribution on the object and light of a second luminance distribution which is uneven distribution being different from the first luminance distribution on the object;

the step of receiving light reflected by the object includes receiving light reflected by the object in each projection cycle by the area sensor comprising the plurality of photoelectric conversion elements; and the step of measuring the distance to each photoelectric conversion element includes measuring the distance to each photoelectric conversion element based on the output of the area sensor in a first projection and the output of the area sensor in a second projection.

14. The three-dimensional measurement method according to claim 12, wherein one of said two gates accumulates an electric charge photoelectrically converted by said each photoelectric conversion element, and the other gate discharges the electric charge photoelectrically converted by said each photoelectric conversion element.

15. A three-dimensional measurement device for measuring the distance to a plurality of positions on an object by projecting light and receiving the light reflected from the object, said three-dimensional measurement device comprising:

a projector for projecting light on the object;

an area sensor comprising a plurality of photoelectric conversion elements for receiving light reflected from the object;

a controller for controlling ON/OFF states of the plurality of photoelectric conversion elements with a timing synchronized with the light projection; and a processor for eliminating the fluctuating component of the received light intensity due to distance or reflectivity of the object from the amount of exposure obtained based on the controlling of the ON/OFF states of the plurality of photoelectric conversion elements, wherein said area sensor including two gates in each photoelectric conversion element for controlling an electric charge photoelectrically converted by said each photoelectric conversion element, the ON/OFF states of said two gates activate alternately, and the ON/OFF states of said two gates are controlled a plurality of times during one accumulating period of the area sensor.

16. A three-dimensional measurement method according to claim 15, wherein one of said two gates accumulates an electric charge photoelectrically converted by a respective photoelectric conversion element, and the other gate discharges the electric charge photoelectrically converted by the respective photoelectric conversion element.

* * * * *